Figure 1:
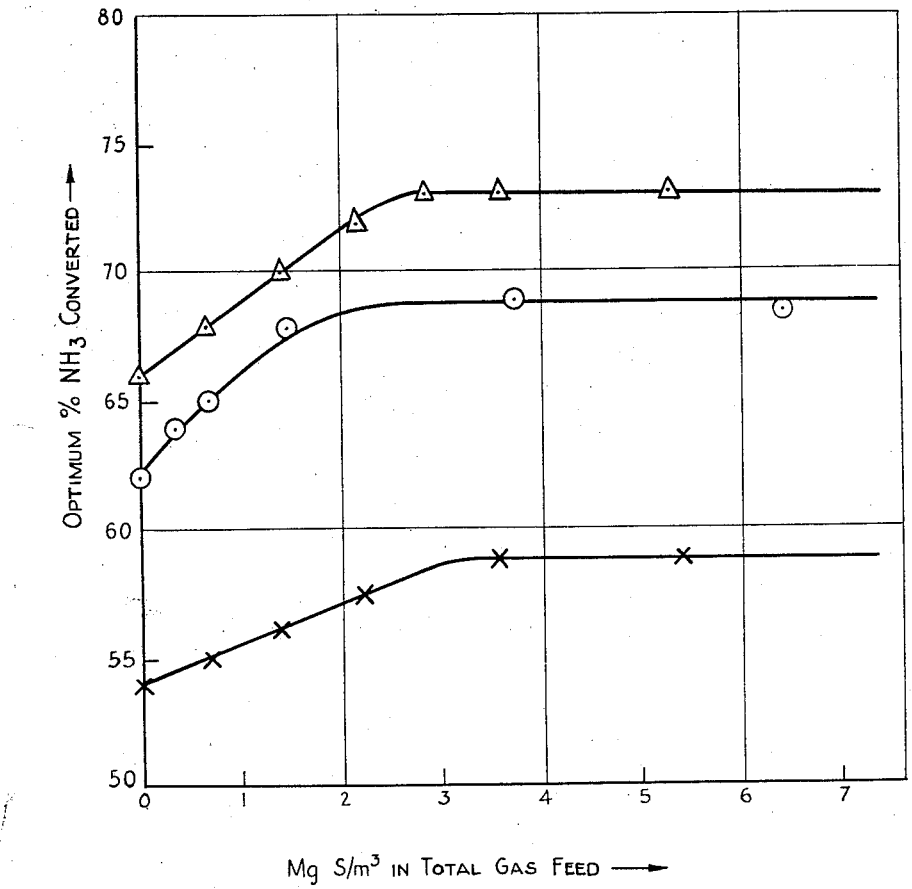

United States Patent Office 3,102,001
Patented Aug. 27, 1963

3,102,001
PROCESS FOR THE PRODUCTION OF HYDROCYANIC ACID
Thomas David Parkhill, Billingham, and John Peter Hodson Shaw, Widnes, England, assignors to Imperial Chemical Industries Limited, London, England, a corporation of Great Britain
Filed Jan. 29, 1960, Ser. No. 5,557
Claims priority, application Great Britain Feb. 18, 1959
5 Claims. (Cl. 23—151)

This invention relates to a process for the production of hydrocyanic acid. More particularly it relates to a process for producing hydrocyanic acid by reaction in the vapour phase of a mixture comprising ammonia, a hydrocarbon such as methane or a mixture of hydrocarbons, and oxygen, by passing the mixture over a catalyst such as platinum metal or platinum metal alloy at a high temperature. Still more particularly it relates to improvements in the process for carrying out this catalysed reaction when certain types of hydrocarbon feed are utilised as raw material.

In the above-mentioned catalytic production of hydrocyanic acid it has been proposed to utilise hydrocarbons from various sources. For example it is known that coke oven gas can successfully be used as the hydrocarbon source. It is also known to utilise the methane and other low molecular weight hydrocarbons in natural gas and in the gases obtained during the cracking of petroleum, but with these hydrocarbon sources the conversion of ammonia and hydrocarbon to hydrocyanic acid is usually less than with coke oven gas.

We have now found that when alternative hydrocarbon sources to coke oven gas are used increased conversion of ammonia and hydrocarbon to hydrocyanic acid can be obtained when controlled additions of volatile sulphur-containing material are made to the reactants. We have found that by taking a feed gas mixture with the optimum oxygen content for conversion without the addition of volatile sulphur-containing material and simply adding to it a controlled amount of said material the conversion of ammonia and hydrocarbon to hydrocyanic acid is at best only slightly increased, but we have also found that the addition of volatile sulphur-containing material alters the oxygen content of the reaction mixture needed for optimum conversion and that by both adding suitable quantities of the sulphur-containing material and working under the so-changed optimum conditions a worthwhile increase in conversion can be obtained.

It is known to use either oxygen itself or air or mixtures of the two as the oxygen source in the catalytic synthesis of hydrocyanic acid and we have found that the addition of volatile sulphur-containing material to feed gases which are free or almost free from such sulphur compounds makes possible an increase in conversion efficiency of 10–12% for oxygen systems and 7–8% for systems working on air, with intermediate figures for mixed systems, the conversion efficiency being calculated as percentage ammonia or hydrocarbon converted to hydrocyanic acid.

Only very small amounts of volatile sulphur-containing material are required in the reactants in order to obtain the increased conversion efficiencies of the present invention. Provided the oxygen content of the reactants is adjusted to the optimum value at all times, the production of a concentration of as little as 1 mg. of sulphur in the form of a volatile sulphur-containing material per m.³ of the reactant mixture shows an increase in conversion efficiency, and with some sulphur-containing materials the maximum promoting effect is reached with as little as 2–3 mg. S per m³. Once this maximum has been reached, the addition of further quantities of sulphur-containing material results in no further increase nor any decrease in conversion efficiency (but continues nevertheless to alter the oxygen content of the reaction mixture required for optimum conversion) until above a level of addition corresponding to 400–500 mg. S per m.³ of the reactant mixture the maximum conversion efficiency obtainable begins to decrease as if at these higher levels of addition the sulphur-containing material is beginning to act as a poison.

According to the present invention therefore, in a process for the manufacture of hydrocyanic acid by reaction of a mixture consisting essentially of ammonia, a hydrocarbon such as methane or a mixture of hydrocarbons, and oxygen by passing the mixture in the vapour phase over a platinum metal or platinum metal alloy catalyst at a high temperature, a volatile sulphur-containing material is added to the reactants in such amount that the said reactants contain 1–500 mg. S per m.³, and the oxygen content of the reactants is adjusted, whereby an increased conversion of ammonia and hydrocarbon to hydrocyanic acid is obtained.

We have found that in all cases the oxygen percentage required in the reactants for optimum conversion of ammonia and hydrocarbon is increased when volatile sulphur-containing material is added to the reactants according to the invention. Nevertheless, because of the increase in conversion of ammonia and hydrocarbon to hydrocyanic acid, the oxygen consumption calculated on the hydrocyanic acid yield is reduced.

Figure 2:
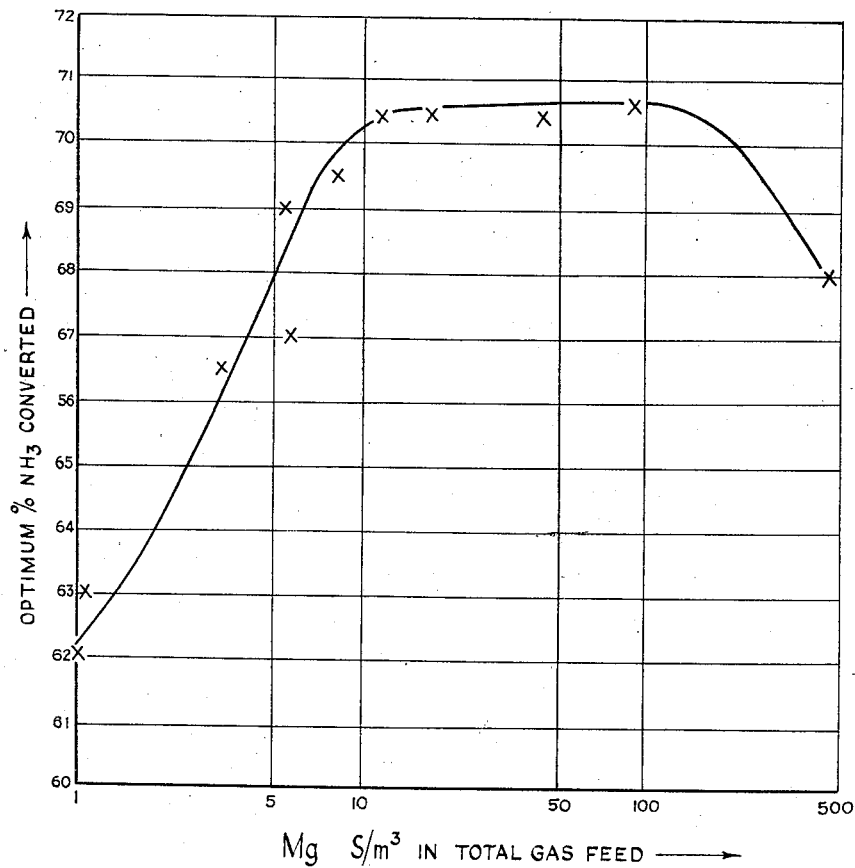

It is known that in the catalytic production of hydrocyanic acid the hydrocarbon content of the reactants can be varied over a wide range, and we have found that the benefits of the process according to the invention are not restricted to any one particular hydrocarbon content of the reaction mixture. The beneficial effect of adding volatile sulphur-containing material to feed gases containing various proportions of hydrocarbon can be clearly seen in the accompanying drawing, FIGURE 1. The hydrocarbon/ammonia ratios as calculated on the amount of methane equivalent in carbon content to the total hydrocarbons present, and which may be expressed as "C:$NH_3$" or "equivalent $CH_4$:$NH_3$," were, by volume, 0.7:1 for the lowest curve, 1:1 for the centre curve and 1.4:1 for the uppermost curve. The sulphur-containing material was added in the form of carbon disulphide and the oxygen content of the reactants was adjusted to obtain maximum ammonia conversion to hydrocyanic acid at each level of addition. It will be seen that in all cases the maximum promoting effect was reached at a level of 2–3.5 mg. S/m.³ of the total gas feed. FIGURE 2 shows the optimum conversions obtained by adding sulphur in the form of thiophene to a feed gas with a C:$NH_3$ ratio of 1:1 and adjusting the oxygen content of the reactants to optimum conversion conditions. In this case it is seen that the maximum promoting effect was reached at a level of approximately 10 mg. S/m.³ of the total feed gases and that when the concentration was raised to 500 mg. S/m.³ the conversion fell away but was still higher at this point than without any thiophene addition.

The volatile sulphur-containing material may be added to the reactor feed in any convenient manner, for example, a suitable gaseous material such as hydrogen sulphide may be added to the reactant gases before they enter the converter or a volatile material such as carbon disulphide may be vaporised into the reactant mixture or into a stream or a suitable volume of one of the reactants, which may then be added to the main feed stream. Alternatively, a gas such as a coke oven gas containing a sufficiently great amount of volatile sulphur-containing material may be mixed with hydrocarbon feed which is sulphur-free or contains less than the optimum amount of volatile sulphur-containing material. It must be understood in this connection that the process according to the invention is applicable to hydrocarbon feeds which are not necessarily completely free from volatile sulphur-containing material but which contain a lesser quantity of said material than is needed to obtain maximum conversion of ammonia to hydrocyanic acid.

The following examples further illustrate the increase in conversion efficiencies obtained in the process according to the invention and also illustrate the effect of volatile sulphur-containing material on the optimum oxygen content of the reaction mixture.

EXAMPLE 1

Figure 3:
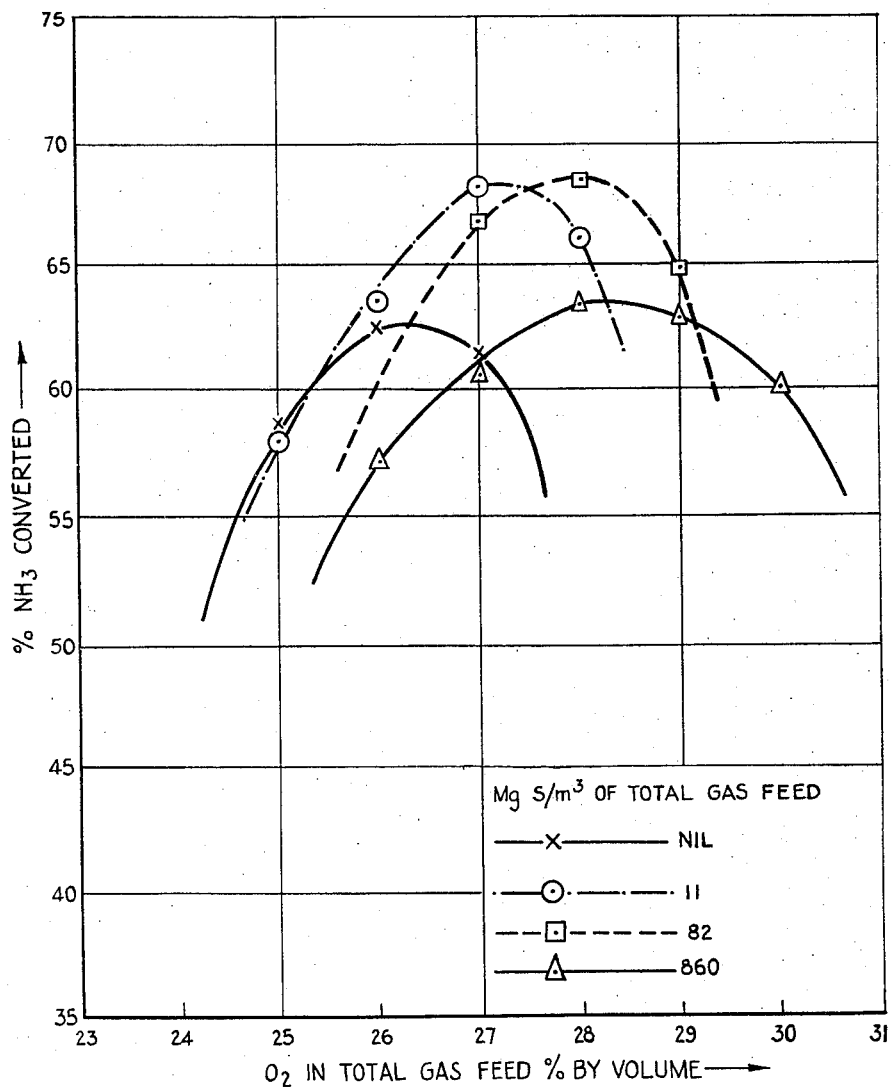

A sulphur-free hydrocarbon feed gas comprising approximately 70% methane and 30% hydrogen was mixed with ammonia gas and oxygen and the mixture was caused to react by passing it over a platinum metal alloy catalyst supported on beryl chips at approximately 1,000° C. The $C:NH_3$ ratio in the reactants (calculated by volume on the equivalent methane content as hereinbefore described) was adjusted to 1:1 and the oxygen content of the feed was varied until the maximum conversion of ammonia to hydrocyanic acid was obtained as found by analysis of the product gases. Various amounts of carbon disulphide were then added to the hydrocarbon gas entering the feed stream, and at each level of carbon disulphide addition the oxygen content of the feed gases was varied to determine the new optimum value of the oxygen content. The results are shown in Table 1 and are expressed graphically in FIGURE 3 of the drawings accompanying the provisional specification.

Table 1

| Mg. $S/m^3$. of total feed gases | $O_2:NH_3$ ratio by volume | $O_2$ in total feed gases by volume, percent | $NH_3$ converted to HCN, percent |
|---|---|---|---|
| 0 | 0.81:1 | 25.0 | 58.7 |
|   | 0.85:1 | 25.9 | 62.5 |
|   | 0.90:1 | 27.0 | 61.5 |
| 11 | 0.81:1 | 25.0 | 58.4 |
|   | 0.85:1 | 25.9 | 63.4 |
|   | 0.90:1 | 27.0 | 68.1 |
|   | 0.95:1 | 28.1 | 66.1 |
| 82 | 0.90:1 | 27.0 | 66.6 |
|   | 0.95:1 | 28.1 | 68.3 |
|   | 0.99:1 | 28.9 | 64.8 |
| 860 | 0.85:1 | 25.9 | 57.2 |
|   | 0.90:1 | 27.0 | 60.6 |
|   | 0.95:1 | 28.1 | 63.2 |
|   | 0.99:1 | 28.9 | 62.8 |
|   | 1.04:1 | 30.0 | 60.1 |

EXAMPLE 2

Figure 4:
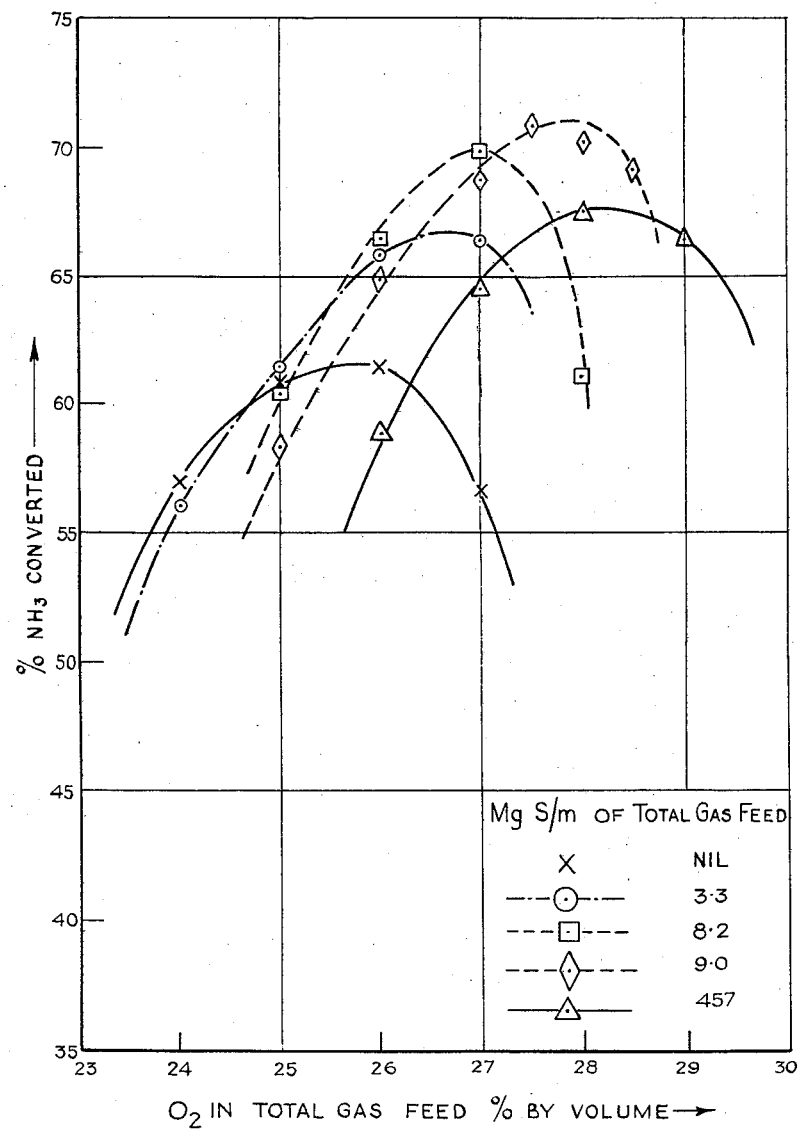

The procedure shown in Example 1 was repeated with the exception that various amounts of thiophene were added instead of carbon disulphide to the hydrocarbon gas entering the feed stream. The results are shown in Table 2 and are expressed graphically in FIGURE 4 of the drawings accompanying the provisional specification.

Table 2

| Mg. $S/m^3$. of total feed gases | $O_2:NH_3$ ratio by volume | $O_2$ in total feed gases by volume, percent | $NH_3$ converted to HCN, percent |
|---|---|---|---|
| 0 | 0.77:1 | 24.0 | 56.9 |
|   | 0.81:1 | 25.0 | 61.0 |
|   | 0.85:1 | 25.9 | 61.4 |
|   | 0.90:1 | 27.0 | 56.7 |
| 3.3 | 0.77:1 | 24.0 | 55.8 |
|   | 0.81:1 | 25.0 | 61.4 |
|   | 0.85:1 | 25.9 | 65.8 |
|   | 0.90:1 | 27.0 | 66.4 |
| 8.2 | 0.81:1 | 25.0 | 60.5 |
|   | 0.85:1 | 25.9 | 66.4 |
|   | 0.90:1 | 27.0 | 69.9 |
|   | 0.95:1 | 28.1 | 60.9 |
| 90 | 0.81:1 | 25.0 | 58.3 |
|   | 0.85:1 | 25.9 | 64.7 |
|   | 0.90:1 | 27.0 | 68.8 |
|   | 0.92:1 | 27.4 | 71.0 |
|   | 0.95:1 | 28.1 | 70.2 |
|   | 0.97:1 | 28.5 | 69.4 |
| 457 | 0.85:1 | 25.9 | 58.8 |
|   | 0.90:1 | 27.0 | 64.6 |
|   | 0.95:1 | 28.1 | 67.6 |
|   | 0.99:1 | 28.9 | 66.5 |

EXAMPLE 3

The procedure shown in Example 1 was repeated with exception that the oxygen was replaced by air. The results are shown in Table 3.

Table 3

| Mg. $S/m^3$ of total feed gases | $Air:NH_3$ ratio by volume | $NH_3$ converted to HCN, Percent |
|---|---|---|
| 0 | 4.72:1 | 52.4 |
|   | 4.93:1 | 57.8 |
|   | 5.15:1 | 59.8 |
|   | 5.39:1 | 56.9 |
|   | 5.92:1 | 41.2 |
| 0.9 | 5.15:1 | 59.4 |
|   | 5.39:1 | 62.4 |
|   | 5.65:1 | 61.8 |
|   | 5.92:1 | 59.1 |
| 2.3 | 5.15:1 | 59.6 |
|   | 5.39:1 | 62.9 |
|   | 5.65:1 | 63.9 |
|   | 5.92:1 | 60.0 |
| 3.5 | 5.15:1 | 61.4 |
|   | 5.39:1 | 63.2 |
|   | 5.65:1 | 63.5 |
|   | 5.92:1 | 62.6 |

EXAMPLE 4

A sulphur-free hrydrocarbon feed gas containing approximately 95% methane, the remainder being mainly nitrogen, was reacted with ammonia and oxygen as in Example 1 at a $C:NH_3$ ratio of 1:1 and, as in Example 1, the oxygen content of the feed gases was varied to obtain optimum conversion of ammonia to hydrocyanic acid at various levels of carbon disulphide addition to the feed stream. A maximum conversion of 61% of the ammonia was obtained when no carbon disulphide was added, and this maximum was increased to 67% at levels of carbon disulphide addition in the range equivalent to 2.3–40 mg. of sulphur per $m.^3$ of the total feed gases.

EXAMPLE 5

Example 4 was repeated but using as the hydrocarbon source a sulphur-free gas containing approximately 40% methane, the remainder being mainly hydrogen. The maximum conversion of ammonia to hydrocyanic acid obtainable without carbon disulphide addition to the feed was found to be 58–59% and this maximum was increased to 64–65% at levels of carbon disulphide addition equivalent to 2–3 mg. of sulphur per $m.^3$ of the total feed gas.

EXAMPLE 6

The procedure shown in Example 1 was repeated with the exception that, instead of carbon disulphide, hydrogen sulphide was added equivalent to 440 mg. of sulphur per $m.^3$ of the total feed gases. The maximum conversion of ammonia to hydrocyanic acid was 63% without hydrogen sulphide addition and was raised to 66% on adding the hydrogen sulphide.

EXAMPLE 7

The procedure of Example 3 was repeated with the exception that sulphur dioxide was added instead of carbon disulphide. A maximum conversion of 58–59% of the ammonia to hydrocyanic acid was obtained when no sulphur dioxide was added and this maximum was increased to 61–62% at a level of sulphur dioxide addition equivalent to 160 mg. of sulphur per $m.^3$ of the total feed gases. It was found that a white deposit was formed in the apparatus owing to interaction of the sulphur dioxide with the ammonia, which probably accounts for the relatively high level of sulphur addition that was required to obtain the maximum promoting effect with this compound.

EXAMPLE 8

A sulphur-free hydrocarbon feed gas comprising approximately 70% methane and 30% hydrogen was mixed with ammonia gas to a $C:NH_3$ ratio of 1:1, calculated by volume on the hydrocarbon and ammonia content as hereinbefore described, and was caused to react by passing it in admixture with oxygen at a linear velocity of approximately 3 ft./sec. (calculated for gases at 20° C. and 760 mm. pressure) through a six-layer platinum/rhodium alloy gauze catalyst. Adjustment of the oxygen content of the feed gases gave a maximum conversion of 59% of the ammonia to hydrocyanic acid. Carbon disulphide was then added to the reactant stream in amount equivalent to approximately 5 mg. of sulphur per m.$^3$ of the total feed gases and the oxygen content of the feed was adjusted to the new optimum value, giving a conversion of 63.5% of the ammonia to hydrocyanic acid.

What we claim is:

1. In a process for the manufacture of hydrocyanic acid by reaction of a mixture consisting essentially of ammonia, a hydrocarbon and oxygen by passing the mixture in the vapour phase over a catalyst for the formation of hydrocyanic acid selected from the group consisting of platinum metal and platinum metal alloys at a high temperature, the improvement which comprises adding to the reactants a volatile sulphur-containing material in such amount that the said reactants contain 1–500 mg. of sulphur per m$^3$ and adjusting the oxygen content of the said reactants for maximum conversion of ammonia and hydrocarbons to hydrocyanic acid, whereby an increased conversion of ammonia and hydrocarbon to hydrocyanic acid is obtained.

2. A process according to claim 1 in which the hydrocarbon:ammonia ratio in the reactants, as calculated on the amount of methane equivalent in carbon content to the total hydrocarbons in the reactants, is in the range 0.7:1 to 1.4:1 by volume.

3. A process according to claim 1 in which the volatile sulphur-containing material is selected from the group consisting of carbon disulphide and thiophene.

4. In a process for the manufacture of hydrocyanic acid by reaction of a mixture consisting essentially of ammonia, a hydrocarbon and oxygen by passing a mixture in the vapor phase over a catalyst for the production of hydrocyanic acid selected from the group consisting of platinum metal and platinum metal alloys at a high temperature, the improvement which comprises adding to the reactants a volatile sulfur-containing material in such amount that the said reactants contain 1–500 mg. of sulfur per m.$^3$ whereby an increased amount of ammonia and hydrocarbon to hydrocyanic acid is obtained.

5. A process for the manufacture of hydrocyanic acid as set forth in claim 1 in which the catalyst is platinum metal.

References Cited in the file of this patent

UNITED STATES PATENTS

| | | |
|---|---|---|
| 2,006,981 | Andrussow | July 2, 1935 |
| 2,726,931 | Stiles | Dec. 13, 1955 |

OTHER REFERENCES

Altieri: "Gaseous Analysis and Testing of Gaseous Materials," published by the American Gas Association, Inc., N.Y., 1st Ed., 1945, page 36.